Oct. 19, 1971 J. H. NORFLEET 3,613,147
WALL SURFACE SCRAPER TOOL
Filed May 26, 1969
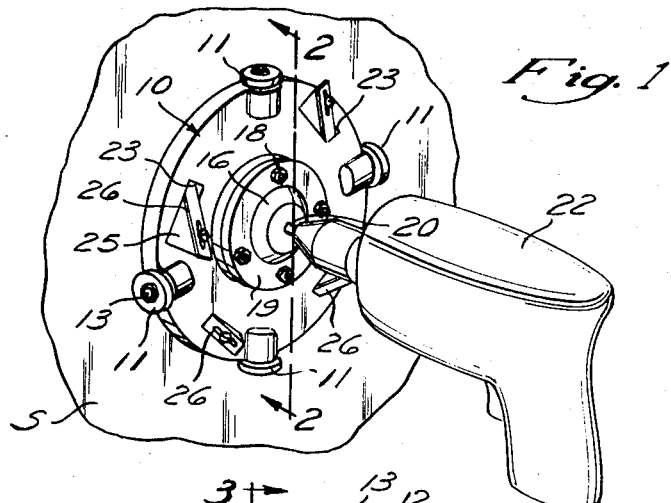
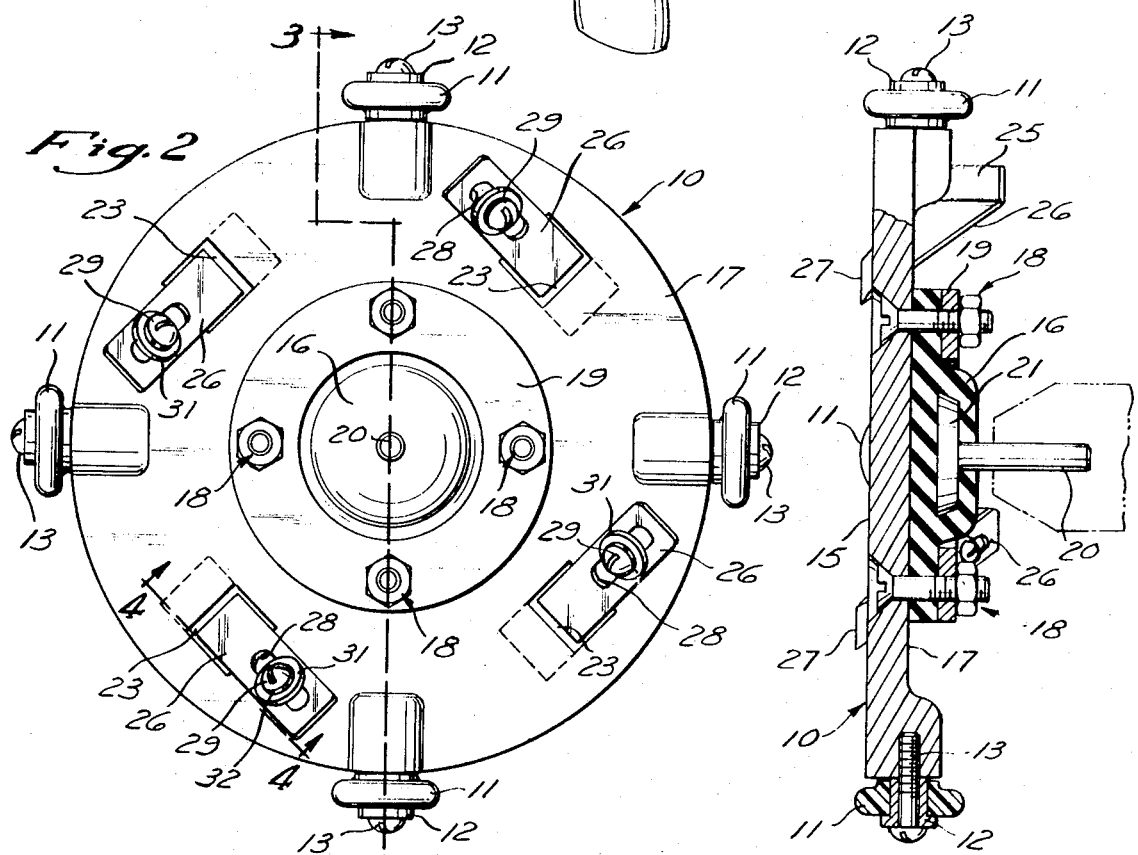
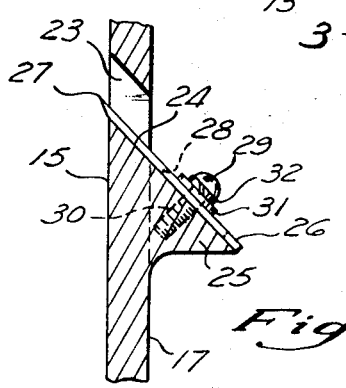
INVENTOR
JOHN H. NORFLEET
BY
ELY, GOLRICK & FLYNN
ATTORNEYS 3,613,147
WALL SURFACE SCRAPER TOOL
John H. Norfleet, 15006 Naples St.,
Cleveland, Ohio 44128
Filed May 26, 1969, Ser. No. 827,850
Int. Cl. A47l 1/06
U.S. Cl. 15—236                        7 Claims

ABSTRACT OF THE DISCLOSURE

Wall surface scraper tool having rollers to engage the surface to be scraped and one or more adjustable blades supported to extend at an acute angle to that surface. The tool is power driven by an electric drill and has a plurality of inclined blades and rollers around its periphery.

---

This invention relates to a tool for scraping off wall surface coverings or the like.

Various wall covering materials of plastic, fabric or both are so tough that they are difficult to remove by conventional scraper tools. The present invention is directed to a tool which is especially well-suited for scraping off such tough wall coverings and which may also be used for various other scraping operations.

Accordingly, it is a principal object of this invention to provide a novel and improved scraping tool which is particularly adapted for scraping off tough wall coverings.

Another object of this invention is to provide such a tool having one or more scraper blades mounted to extend at an acute angle to the surface to be scraped and having a scraping edge extending substantially perpendicular to the direction in which the tool is moved across the surface to be scraped.

Another object of this invention is to provide such a tool having one or more blades mounted in the manner just described and adjustable on the tool toward or away from the surface to be scraped.

Another object of this invention is to provide a novel and improved scraper tool having rollers for engagement with the surface to be scraped, and one or more scraper blades inclined with respect to the surface to be scraped and having a scraping edge extending substantially perpendicular to the direction of movement of the tool across the surface to be scraped.

Another object of this invention is to provide a scraper tool as just stated which may be driven by an electric drill or the like and which has the rollers and scraper blades spaced apart around its axis of rotation.

Further objects and advantages of this invention will be apparent from the following detailed description of a presently-preferred embodiment thereof, which is shown in the accompanying drawing.

In the drawing:

FIG. 1 is a perspective view showing a rotary scraper tool in accordance with the present invention driven by a conventional electric hand drill;

FIG. 2 is a plan view of this tool, viewed from the line 2—2 in FIG. 1;

FIG. 3 is a longitudinal section through this tool taken along the line 3—3 in FIG. 2; and FIG. 4 is an enlarged section showing the mounting of one of the scraper blades on this tool, taken along the line 4—4 in FIG. 2.

Referring to the drawing, the present invention comprises a blade support structure in the form of a generally circular plate 10 having four rollers 11 spaced apart around its periphery at 90° intervals. As best seen in FIG. 3, each roller 11 is mounted on a flanged bushing 12 encircling a bolt 13 whose screw-threaded inner end is received in a complementary screw-threaded opening 14 in the plate 10 extending radially inward from its periphery. Each roller 11 preferably is of nylon or other self-lubricating material. Each roller projects slightly beyond the flat inner side face 15 of plate 10, so that when the tool is positioned against a flat wall surface S, as shown in FIG. 1, with the rollers 11 engaging this wall surface, the inner side face 15 of the plate 10 is spaced slightly from the wall surface and the axis of rotation of each roller extends parallel to the wall surface.

A cushioning pad 16 (FIG. 3) of rubber-like material is clamped against the outer face 17 of the plate 10 by nut-and-bolt assemblies 18 and an annular metal plate 19. A spindle 20, extending perpendicular to plate 10 at the latter's center, carries an enlarged annular head 21 at its inner end which is embedded in and bonded to the pad 16, such as by vulcanized adhesion. The outer end of this spindle 20 is adapted to be received in the chuck of a conventional, hand-held electric drill 22 (FIG. 1), so that the plate 10 may be rotated by the drill about the axis of the spindle 20.

The plate 10 has four openings 23 evenly spaced apart circumferentially about its rotational axis. As best seen in FIG. 4, at each of these openings 23 the plate 10 presents an inclined, flat, blade support surface 24 extending at an acute angle to the inner side face 15 of the plate and to the axes of rotation of the rollers 11. This blade support surface 24 is provided by one side of the opening 23 and a lug 25 extending outwardly from the outer face 17 of the plate 10. The inclined blade support surface 24 across its width is disposed substantially radially of the rotational axis of the spindle 20.

A flat scraper blade 26 is clamped to the plate at each blade support surface 24, extending through the respective plate opening 23 and terminating in a sharpened beveled scraping edge 27 (FIG. 4) which is disposed inwardly beyond the inner side face 15 of the plate 10. As best seen in FIG. 3, the scraping edges 27 of the scraper blades are substantially coplanar with the peripheries of the rollers 11 just beyond the inner side face 15 of plate 10, and these scraping edges extend transverse to the direction in which the rollers roll across the surface to be scraped.

Each scraper blade 26 has an elongated slot 28. A clamping bolt 29 passes through the slot 28 in each scraper blade and is threadedly received in a complementary screw-threaded opening 30 in the respective lug 25 on plate 10. A flat washer 31 and a lock washer 32 are engaged between the head of each clamping bolt 29 and the respective blade 26. With this arrangement each scraper blade 26 may be adjusted along the blade support surface 24 to position its scraping edge at the desired position inward past the inner side face 15 of the plate 10.

In using this tool, the user positions the drill 22 to maintain the rollers 11 in rolling engagement with the wall surface S to be scraped, as shown in FIG. 1. As the blade support plate 10 is rotated clockwise in FIGS. 1 and 2, it moves each scraper blade 26 in a circular path about the axis of spindle 20, with the scraping edge 27 on each blade extending substantially radially of this circular path. That is, each scraping edge 27 extends substantially perpendicular to the direction in which it is being revolved by the rotating plate 10. Each scraper blade 26 is inclined inwardly toward the surface S in the direction of rotation of plate 10, so that the material scraped off by the scraping edge 27 moves outwardly across the blade 26 and out through opening 23 in the plate.

In the particular embodiment shown in FIGS. 1–4, the openings 23 in the plate are located at substantially the same distance radially outward from the rotational axis of the plate. However, if desired they may be at different radial distances from this axis so that a greater area of the wall surface may be scraped in each rotation of the plate.

I claim:
1. A tool for scraping wall surfaces and the like comprising:
   a blade support structure rotatable about a predetermined axis of rotation;
   a plurality of rollers attached to said blade support structure and spaced apart around the latter's axis of rotation and projecting beyond one side of said blade support structure for rolling engagement with the surface to be scraped, each of said rollers having a predetermined axis of rotation extending transverse to the axis of rotation of said blade support structure;
   said blade support structure presenting a plurality of inclined blade support surfaces spaced apart around its axis of rotation and extending transverse to its direction of rotation, each of said blade support surfaces extending at an acute angle to the surface to be scraped when said rollers are in rolling engagement with said surface;
   and a plurality of scraper blades respectively clamped against said blade support surfaces and each projecting beyond said one side of the blade support structure at an acute angle to the surface to be scraped when said rollers engage the latter, each of said blades terminating beyond said one side of the blade support structure in one or more scraping edges extending transverse to the direction of rotation of said blade support structure and transverse to the direction of the rollers as they roll across the surface to be scraped.

2. A tool according to claim 1, wherein said blade support has openings next to said blade support surfaces for passing the material scraped by the blades.

3. A tool according to claim 1, wherein each blade is adjustable along the respective blade support surface to determine the spacing of its scraping edge beyond said one side of the blade support structure.

4. A tool according to claim 3, wherein each blade has an elongated longitudinal slot therein, and further comprising clamping bolts extending through said slots in the respective blades and threadedly received in the blade support member.

5. A tool according to claim 1, wherein said rollers are located beyond the periphery of the blade support structure.

6. A tool according to claim 5, wherein said blade support structure has openings therethrough next to said blade support surfaces for passing the material scraped by the blades.

7. A tool according to claim 6, wherein each blade is adjustable along with the respective blade support surface to determine the spacing of its scraping edge beyond said one side of the blade support structure.

References Cited
UNITED STATES PATENTS

| | | | |
|---|---|---|---|
| 629,487 | 7/1899 | Boufford | 30—171 |
| 1,311,538 | 7/1919 | Tacy | 30—170 |
| 1,448,890 | 3/1923 | Weigel | 30—170 |
| 2,882,594 | 4/1959 | Long | 30—170 |
| 3,082,452 | 3/1963 | Heine et al. | 15—93 |
| 3,309,729 | 3/1967 | Dresser | 15—236 |

FOREIGN PATENTS

| | | | |
|---|---|---|---|
| 181,005 | 2/1955 | Austria | 15—93 |
| 699,121 | 10/1953 | Great Britain | 15—236 |

BILLY J. WILHITE, Primary Examiner